(12) United States Patent
Yona et al.

(10) Patent No.: US 7,245,660 B2
(45) Date of Patent: Jul. 17, 2007

(54) METHOD AND AN APPARATUS FOR MIXING COMPRESSED VIDEO

(75) Inventors: Ilan Yona, Tel Aviv (IL); Moshe Elbaz, Kiriat Bialik (IL)

(73) Assignee: Polycom, Inc., Pleasanton, CA (US)

(*) Notice: Subject to any disclaimer, the term of this patent is extended or adjusted under 35 U.S.C. 154(b) by 891 days.

(21) Appl. No.: 10/310,728

(22) Filed: Dec. 4, 2002

(65) Prior Publication Data

US 2003/0123537 A1 Jul. 3, 2003

Related U.S. Application Data

(60) Provisional application No. 60/337,121, filed on Dec. 4, 2001.

(51) Int. Cl.
*H04N 7/12* (2006.01)
*H04B 1/66* (2006.01)
(52) U.S. Cl. .................................. 375/240.13; 382/239
(58) Field of Classification Search ............ 375/240.11, 375/240.13, 240.12; 370/261; 382/239; 348/14.01, 14.08
See application file for complete search history.

(56) References Cited

U.S. PATENT DOCUMENTS

| 5,764,277 | A | * | 6/1998 | Loui et al. ................ 348/14.01 |
| 6,038,371 | A | | 3/2000 | Shimoda et al. ............. 386/111 |
| 6,198,500 | B1 | | 3/2001 | Watanabe et al. ............. 348/17 |
| 6,229,850 | B1 | * | 5/2001 | Linzer et al. ........... 375/240.11 |
| 6,333,948 | B1 | | 12/2001 | Kurobe et al. .......... 375/240.13 |
| 6,452,973 | B1 | | 9/2002 | Hwang .................. 375/240.27 |
| 6,483,875 | B1 | | 11/2002 | Hasebe et al. .......... 375/240.15 |
| 6,956,600 | B1 | * | 10/2005 | Gaylord ................... 348/14.08 |
| 6,987,889 | B1 | * | 1/2006 | Horowitz ................... 382/239 |
| 2005/0286444 | A1 | * | 12/2005 | Yang et al. .................. 370/261 |

* cited by examiner

*Primary Examiner*—Gims Philippe
(74) *Attorney, Agent, or Firm*—Wong, Cabello, Lutsch, Rutherford, & Brucculeri, LLP

(57) ABSTRACT

A system for controlling a conference that takes input streams from a variety of sources, at least some of the streams having a relatively low-resolution, and composes the input streams into a single output stream of a relatively high-resolution. In doing the conversion the system takes intra Macro Blocks (MBs) of the input stream and produces inter output frames. As part of the conversion process, the system converts the Groups Of Blocks (GOBs) that have GOB headers into slices.

8 Claims, 14 Drawing Sheets

Inter Frame Transmission Routine

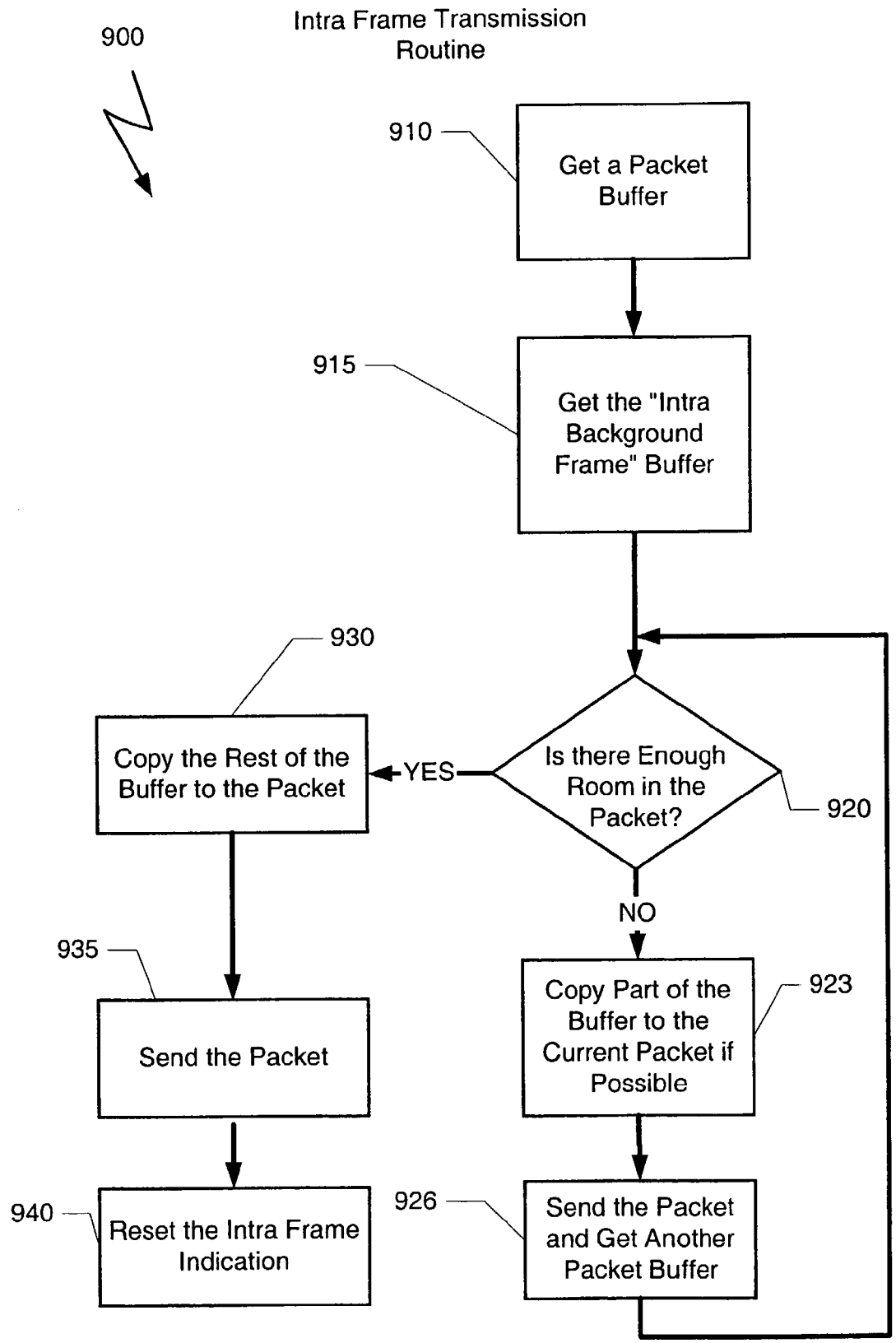

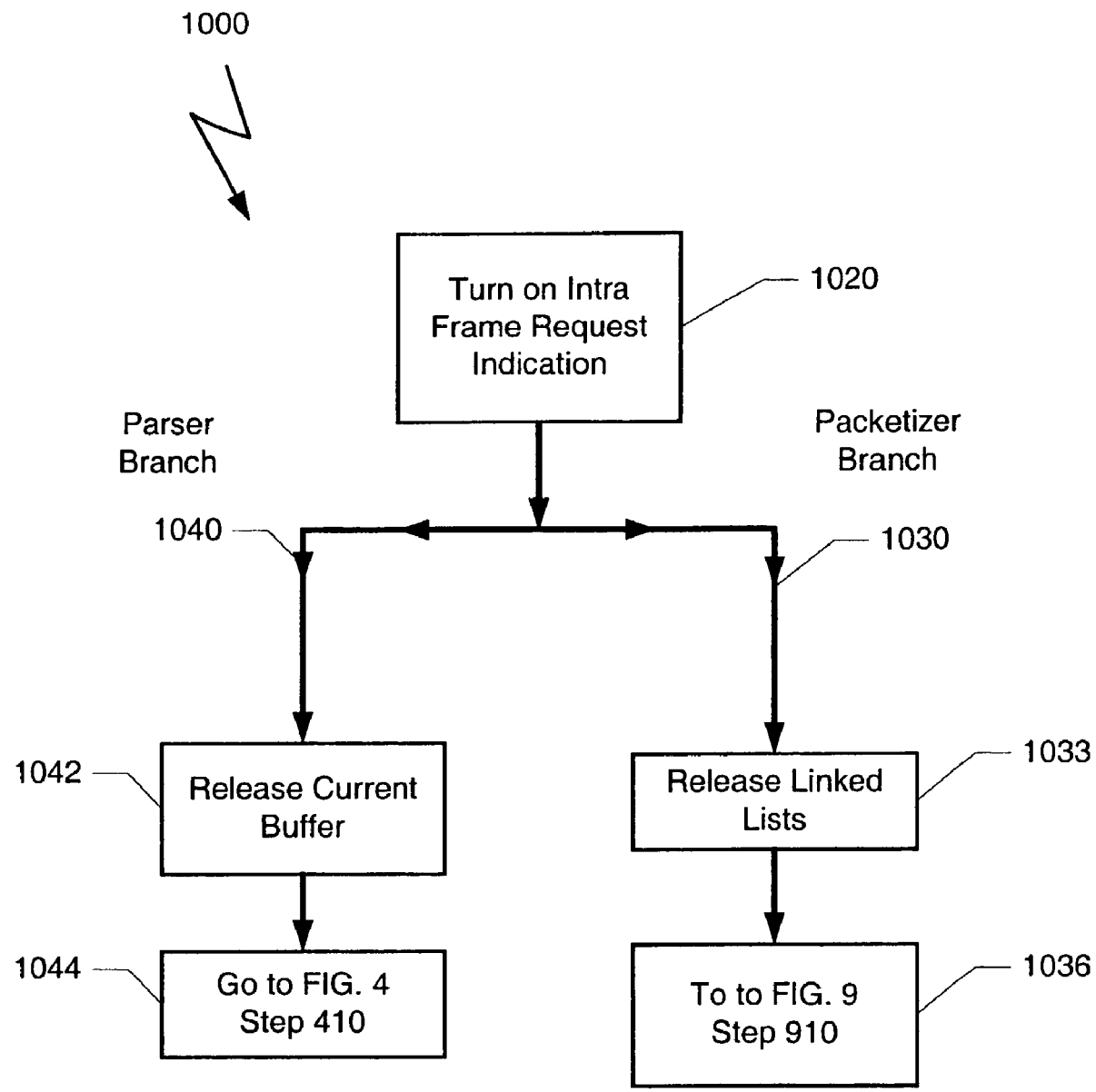

METHOD AND AN APPARATUS FOR MIXING COMPRESSED VIDEO

CROSS REFERENCE TO RELATED APPLICATIONS

This application claims the benefit of Provisional Patent Application Ser. No. 60/337,121 filed on Dec. 4, 2001, entitled "Method and an Apparatus for Mixing of Compressed Video," which is incorporated herein by reference.

BACKGROUND

1. Field of the Invention

The present invention relates to video communication and more particularly to a method and an apparatus for mixing bit streams of compressed video from more than one video source.

2. Description of the Prior Art

Video communication between more than two video terminals often requires a Multipoint Control Unit (MCU), a conference controlling entity that typically is a piece of equipment located in a node of a network or in a terminal which receives several channels from access ports and, according to certain criteria, processes audiovisual signals and distributes them to a set of connected channels. Examples of MCUs include the MGC-100, which is available from Polycom Networks Systems Group, the assignee of the present invention. A terminal (which may be referred to as an endpoint) is a location on the network, capable of providing real-time, two-way audio and/or visual communication with other terminals or the MCU.

The MCU may include a bank of decoders, encoders, and bridges. The MCU may use a large amount of processing power to handle video communications between a variable number of participants, using a variety of communication and compression standards and a variety of bit streams, for example. The MCU may need to compose these bit streams into a single output stream that is compatible with a conference participant to which the output stream is being sent. Thus, an MCU may need to convert a variety of compression and communication standards having a variety of resolutions into an output stream of a single resolution, compression standard, and communication standard. Consequently, an MCU is typically an expensive and rather complex product.

In more recent years, videoconferencing and other forms of multimedia communications have become more commonplace. The advent of personal computers having videoconferencing capabilities creates a demand for MCUs having the capability of multimedia communication between devices housed on Local Area Networks (LANs). This trend raises the need for low cost MCUs. However, low cost MCUs may only handle a limited multipoint communication (e.g., a limited number of compression standards, a limited number of conferees, and a limited number of layouts).

U.S. Pat. No. 5,675,393 discloses an image processing apparatus for composing a plurality of coded images into one image without decoding the plurality of coded images when the images are transmitted using the H.261 standard.

Quarter Common Intermediate Format (QCIF) is a videoconferencing format that specifies a video frame containing 144 lines and 176 pixels per line. This is one-fourth the resolution of Common Intermediate Format (CIF). QCIF support is required by some of the International Telecommunications Union (ITU) videoconferencing standards.

U.S. patent application Ser. No. 09/768,219, Pub. No. 2001/0019354A1, entitled, "Method and an Apparatus for Video Mixing of Bit Streams," discloses a method and apparatus for mixing as many as four QCIF H.263 compressed video bit streams into a composite CIF image.

However, U.S. patent application Ser. No. 09/768,219 does not teach how an MCU can handle a conference in a real communication environment where the different terminals transmit their intra frames at different times forcing the MCU to multiplex an intra frame from one terminal with an inter frame from other terminals. An inter frame is an example of a referential frame, which is a frame that gives the difference between two frames. An intra frame is a type of non-referential frame. A frame is composed of an array of MBs (Macro Blocks). In H.263 it is difficult to multiplex a low-resolution intra frame as part of a high-resolution inter frame without converting it to an inter frame format, since the encoding of an intra-MB in an intra frame is different from an intra-MB in an inter frame.

Furthermore, U.S. patent application Ser. No. 09/768,219 does not teach how the MCU handles a need to request an intra frame from one of or some of the sources. For example, it is not clear how the MCU handles a request for an intra frame, which is due to a packet from one of the sources that is missing or arrives late.

In addition, the method that is described in U.S. patent application Ser. No. 09/768,219 requires recalculation of the quantizers and/or the Discrete Cosine Transform (DCT) coefficients in some of the MBs. This recalculation requires time and computing power. Therefore, (although possibly not recognized heretofore) there is a need for a method and apparatus that can handle a conference in a real communication environment by composing low-resolution compressed video frames (such as QCIF and CIF frames) into a higher resolution frame such as a CIF or 4CIF frame, respectively, without recalculating the Motion Vector Data (MVD) and/or the quantization coefficients.

SUMMARY OF THE INVENTION

In one embodiment, the present invention may include a method and an apparatus for multiplexing low-resolution compressed video frames, QCIF, that have been compressed according to compression standards such as, but not limited to, H.263, and MPEG 4 into a higher resolution frame, such as CIF and 4CIF frames according to another or the same compression standard while using slices instead of Group Of Blocks (GOBs).

Moreover, in accordance with an exemplary method of the present invention, the method overcomes the problem of multiplexing a low-resolution intra frame as part of a high-resolution inter frame by converting each received low-resolution intra frame format into a low-resolution inter frame format. When there is a need for the MCU to send a high-resolution intra frame, the appropriate video source or sources are requested to send the low-resolution intra frame. The MCU sends an artificial high-resolution intra background frame as the response for the request for an intra frame. Later, the received low-resolution intra frames from the appropriate video sources are converted to low-resolution inter frames and are delivered by the MCU as part of the consecutive high-resolution inter frames.

Furthermore, in accordance with an embodiment of the present invention, the method and the apparatus utilizes linked lists as an editorial tool to overcome the differences in the transmitting parameters of the different terminals.

BRIEF DESCRIPTION OF THE DRAWINGS

The invention will be more readily understood from reading the following description and by reference to the accompanying drawings (forming a part of the description), wherein an example of the invention is shown.

FIG. 9 is a flowchart showing an exemplary method for transmitting an intra frame; and FIG. 10 is a flowchart showing an exemplary method for handling a fast update request.

DESCRIPTION OF THE INVENTION

Figure 1:
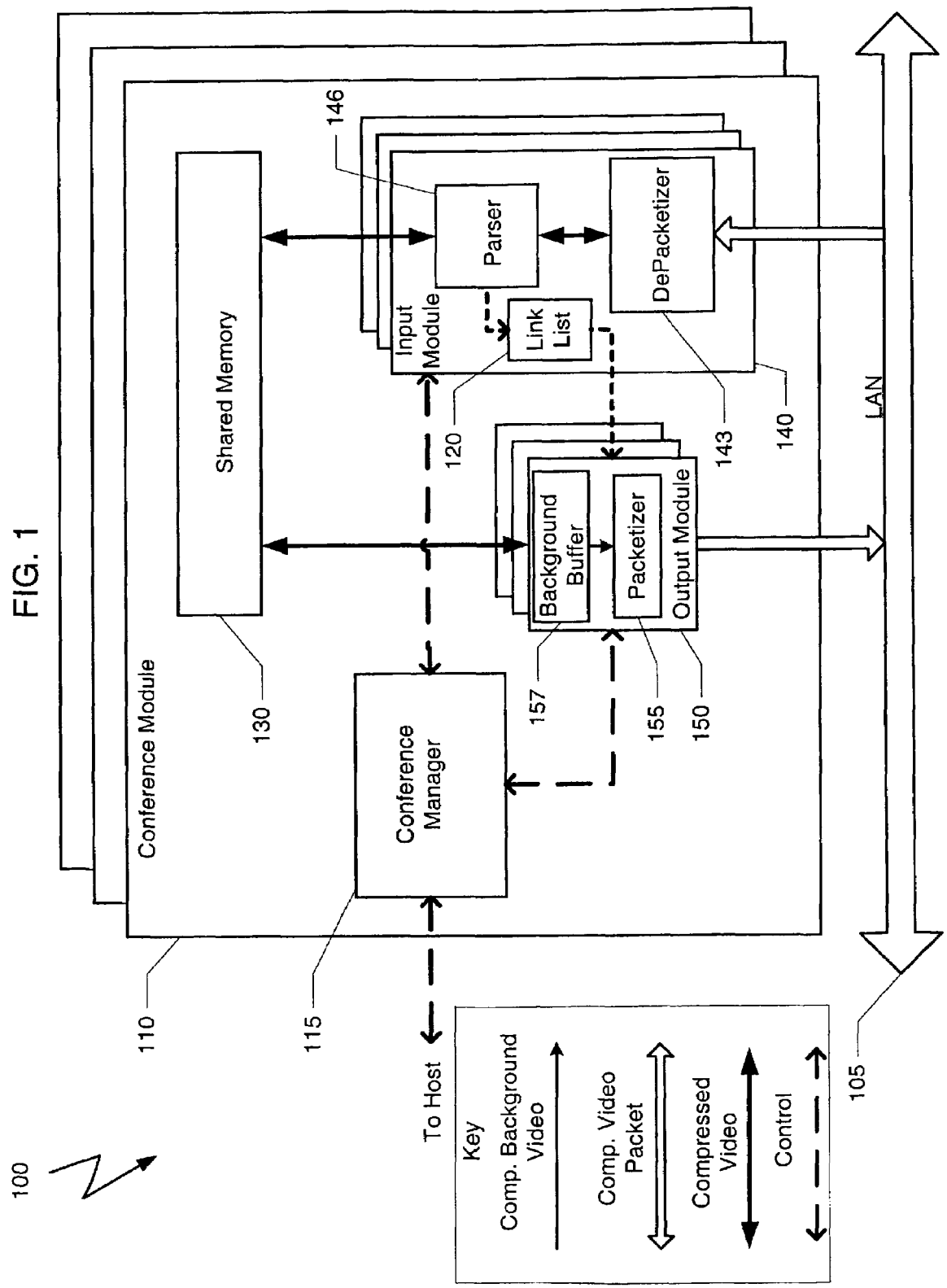
FIG. 1 is a block diagram illustrating an exemplary embodiment of a conferencing module according to the present invention.

Referring now to the drawings, in which like numerals refer to like parts throughout the several views, exemplary embodiments of the present invention are described.

An embodiment of the invention is described using an example including a detailed description of an MCU that multiplexes up to four compressed video frames, having a QCIF low-resolution format, into a single CIF high-resolution frame using H.263 as the compression standard. However, the example is not intended to limit the scope of the invention. Some embodiments of the present invention may multiplex up to four CIF low-resolution frames into a single 4CIF frame, or up to 16 QCIF frames into a 4CIF frame or combinations of one or more QCIF frames and one or more CIF frames into a 4CIF frame. Moreover, the H.263 compression standard is used only as an example. Other standards may be used such as, but not limited to, MPEG 4.

FIG. 1 is a block diagram of an exemplary MCU 100, according to an exemplary embodiment of the present invention. An MCU 100 may include a Local Area Network (LAN) 105 and a plurality of conference modules 110, each having a conference manager 115, a shared memory 130, a plurality of input modules 140, and a plurality of output modules 150. Each input module 140 may include a linked list 120, a depacketizer 143, and a parser 146. Each output module 150 may include a depacketizer 155 and a background buffer 157.

A plurality of endpoints, terminals, (not shown), which are connected over a packet based network (not shown), are connected to LAN 105 via Network Interface Modules (not shown).

The conference module 110 may use the H.263 compression standard or any other compression standard, for example. The conference module 110 may be a logical unit and may be a hardware module, a firmware module, a software module or any combination of the three. Each module may be a permanent logical module or a temporary one, which is generated by the host computer or appliance of the MCU 100 according to the current needs. Generating temporary logical modules and allocating permanent modules according to the current needs improves the utilization of the resources of the MCU 100.

The linked list 120 may be a linked list of frames of information. The number of the input modules 140 in each conference module 110 can be a fixed number, such as four (e.g., one input module 140 for each square in the screen layout), or it can be a variable number that is set according to the needs of the conference. For example, there may be one input module 140 for each endpoint (not shown in the drawings) that participates in the conference, or one input module 140 for each currently visible participant in the relevant screen layout. In an embodiment, the number of the input modules 140 in the conference and the screen layout can be dynamically changed during the conference. The terminals (not shown), which are connected to the input modules 140 via LAN 105, can also be dynamically switched by the host (not shown) during the conference.

The depacketizer 143 grabs the appropriate compressed video packets from the LAN 105. These packets are received from the endpoint that has been assigned by the host, via the conference manager 115, to the depacketizer 143. The packets are in QCIF format. The depacketizer 143 processes the packets according to a media transport protocol such as Real time Transport Protocol (RTP) and transfers the compressed video bit stream to the parser 146, which parses the bit stream and converts it to an output stream according to the methods that are described below in conjunction with FIGS. 4b, 5, 6 and 7.

At the end of grabbing, depacketizing, and parsing the packets from the LAN 105, the parser 146 stores the converted compressed video bit stream and the recommended division points in the shared memory 130. (Recommended division points are points along the image stream that may be used to divide the image stream into packets. Recommended division points are also discussed below in conjunction with FIGS. 5a and 5b). The parser 146 stores the pointers to those buffers in the linked list 120. Using the linked list 120, the parser 146 generates a chain of input buffers in the shared memory 130. Moreover, in some embodiments, the shared memory 130 and the linked list 120 may be replaced by using a First In First Out (FIFO) unit for each input module 140.

Each conference module 110 may include a plurality of the output modules 150. In an exemplary embodiment of the present invention, one output module 150 is used for each endpoint that participates in the conference. Another embodiment may have one output module 150 for each type of screen layout, and may multicast its output to the endpoints that are using this layout. In another embodiment, an MCU 100 may have one output module 150 for each end point in addition to having one output module 150 for each screen layout.

The Output module 150 may include a packetizer 155 and a background buffer 157 for storing the compressed video data of background images that may replace video from the endpoints. Output module 150 may be a logical module including any one or any combination of software, hardware, and firmware.

The following are few examples of types of compressed video that may be stored in the background buffer 157.

A high-resolution (CIF) intra background frame that replaces a composed high-resolution intra frame.

A group of high-resolution Not Coded Slices (NCSs) in which there is one high-resolution NCS for each input module 140. An NCS is a slice that is similar to the same slice in the previous frame, and therefore it is not coded. An NCS buffer is compatible with a low-resolution frame (such as a QCIF frame). This NCS is used in case the appropriate linked list 120 is empty when the packetizer 150 needs its data. Each NCS has the same Macro Block Address (MBA) field as its appropriate input module 140. The MBA field in a slice header is the field that contains the Identification (ID) number of the first MB in the slice.

One NCS buffer for each empty screen part (some examples of empty screen parts are discussed in conjunction with FIG. 2, below) in the screen layout.

The packetizer 155 is responsible for converting the requested screen layout into one of higher resolution image, dividing the high-resolution compressed video frame into packets according to the media transfer protocol (such as RTP), and sending the packets to their destinations.

The data in the background buffer 157 is prepared before the starting of the conference. The first MB in each slice has the appropriate ID number, which indicates its location in the screen layout. The background buffer 157 also stores data associated with the empty screen parts.

The output module 150 gets, from the conference manager 115, the type of screen layout to generate, the appropriate input modules 140 that comprise the required screen layout, and the data to be stored in the background buffer 157. The output module 150 reads the data from the shared memory 130 based on the linked list 120 that belongs to the input modules 140 and the data associated with the empty screen part stored in the background buffer 157. The output module 150 then composes the data from the different sources (e.g., input modules 140 and possibly other sources), into a single high resolution compressed video output stream according to H.263 Annex K.

Then the packetizer 155 divides the compressed video bit stream into packets, according to the RTP, using the recommended division points that have been prepared by the parser 146.

The output module 150 transmits the packet from the packetizer 155 via the LAN 105 to its destination. Some exemplary methods of the operation of the packetizer 155 are described below in conjunction with FIGS. 8 and 9.

The conference manager 115 manages the conference. The conference manager 115 receives control signals from the host (not shown) that convey the desired conference layouts and the parameters of the appropriate endpoints. The conference manager 115 gives each one of its input modules 140 the source address. Moreover, the conference manager 115 gives the type of the screen layout to the output module 150 and loads the compressed video data of the intra background frame, the NCS, and the empty screen part into the background buffer 157. The conference manager 115 also gives the destination address for its packets and assigns the appropriate input modules 140 to be used in composing the screen layout. Exemplary methods of the operation of the conference manager 115 are described below in conjunction with FIGS. 2, 3 and 10.

The MCU 100, during the conference setup, negotiates with each of the endpoints to set an asymmetric conference in which each of the endpoints transmits the compressed video using a compression standard (e.g., H.263) and a first resolution (e.g., QCIF, CIF resolution) and receives the compressed video in a higher resolution (e.g., CIF or 4CIF) using H.263 Annex K, for example. Therefore, the transmitting bit rate of each endpoint (not shown) is smaller than its receiving bit rate. The exemplary embodiment of the present invention may use the "Rectangle Mode" of Annex K, which means that all of the slices are rectangles and/or the "Arbitrary Mode," which declares that the slices within a frame may be in an arbitrary order.

At the end of the conference setup process the host (not shown) of the MCU allocates the resources, such as the amount of input modules 140 and output modules 150, to the relevant conference module 110 supporting the conference. The resource allocation depends on the conference layout. The host loads the conference manager 115 with the communication parameters of each of the endpoints and the required layout or layouts of the conference.

Figure 2A:
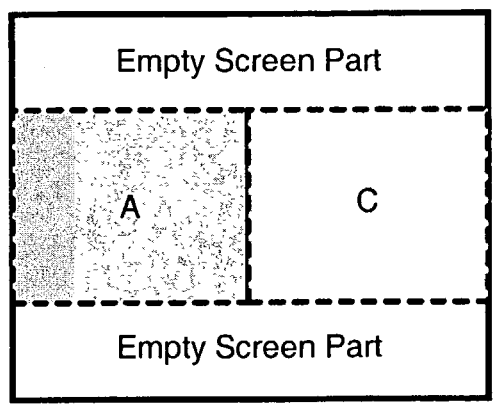
FIG. 2 shows several exemplary screen layouts.
Figure 2B:
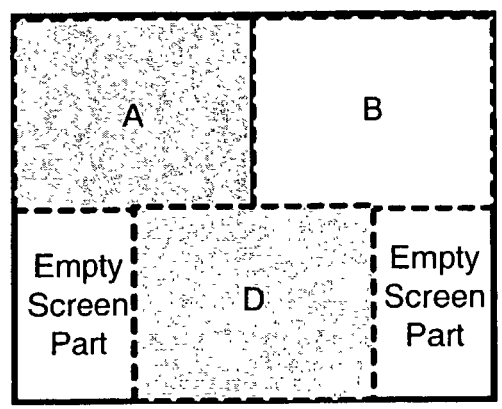
Figure 2C:
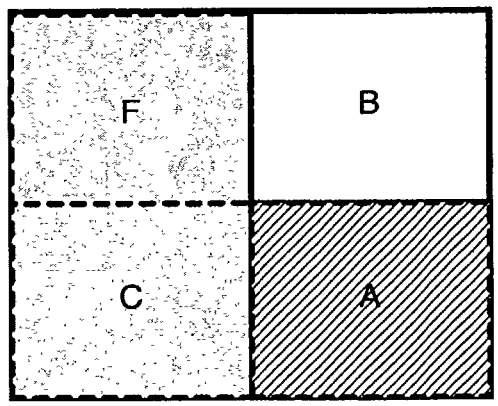

The present invention can support different conference layouts, such as a conference with three conferees in which each of the conferees will see the other two and a background slice in the empty screen parts, as shown in FIG. 2a, which illustrates the screen of participant B. FIG. 2b represents an exemplary screen of conferee C in a conference with four participants. FIG. 2c represents an exemplary screen of conferee E in a conference with six participants when the speaker is conferee F.

Figure 3:
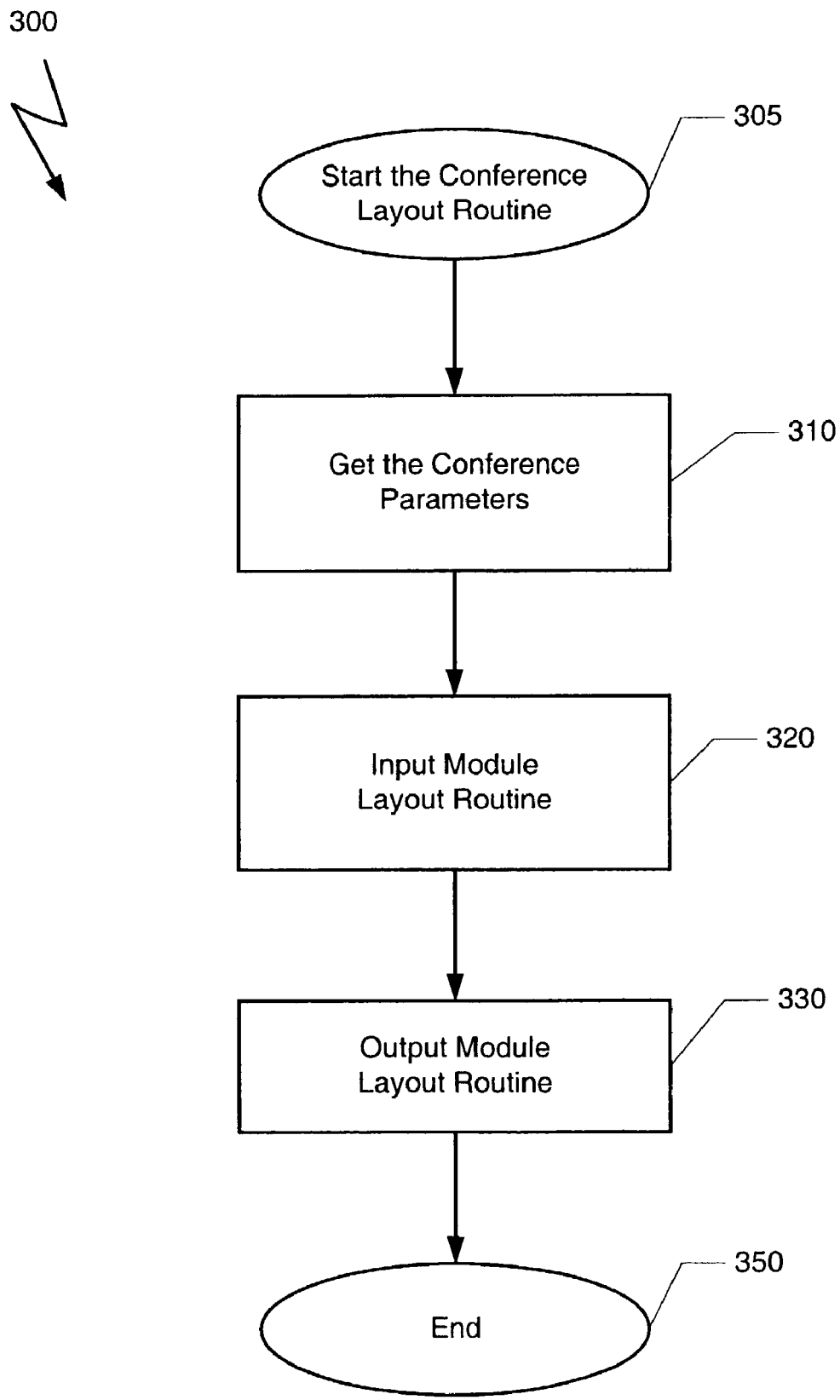
FIG. 3 is a flowchart showing an exemplary method for setting a conference module at the beginning of a conference or while changing layouts.

FIG. 3 is a flowchart showing an exemplary method 300 for setting a conference module 110. In step 305, method 300 is initiated. Step 305 may be an automatic activation of method 300 that occurs at the beginning of a conference or upon changing the conference layout, for example. A change in the conference layout may occur, for example, when the speaker is changed, thereby automatically starting method 300. In step 310 the conference manager 115 receives and/or actively grabs the communications parameters of each of the endpoints that participate in the conference. Then the conference manager 115 receives and/or actively grabs the parameters of the conference layouts, such as the type of screen layout for each endpoint and the locations of the different video sources in the conference layout.

In step 320, an input module conference layout routine is performed. The conference manager 115 assigns each input module 140 to an endpoint by loading the depacketizer module 143 with the source address of the packets that it has to grab and/or receive from the LAN 105. Based on the assigned location of the input module 140 in the conference layout, the conference manager 115 calculates the new ID number of the first MB of the low-resolution picture in the required screen layout and loads this number to the parser 146 of the input module 140. If one of the endpoints participates in a plurality of layouts at different locations, each location requires a dedicated input module 140 with the appropriate ID number of the first MB.

In another exemplary embodiment, the ID numbers of the MBs are supplied by the output module 150. In such an embodiment, each endpoint may have a single input module 140, which is not aware of the location of the data in the composed layout. Therefore, the input module 140 does not add the MBs' ID numbers to the data. The MBs' ID numbers are added by the output module 150 while composing the high-resolution frame. The conference manager 115 repeats step 320 for each of the input modules 140.

Then the conference manager 115 performs the output module screen layout routine, step 330, by loading each output module 150 with the destination address or addresses of its packets. If the layout includes one or more empty screen parts the conference manager 115 transfers the compressed video data of the empty screen part to the output module 150 with the data of the background intra frame and the NCS of the QCIF frames. This compressed video data is stored in the background buffer 157. The conference manager 115 repeats step 330 for each output module 150. Process 300 is then terminated in step 350.

Figure 4A:
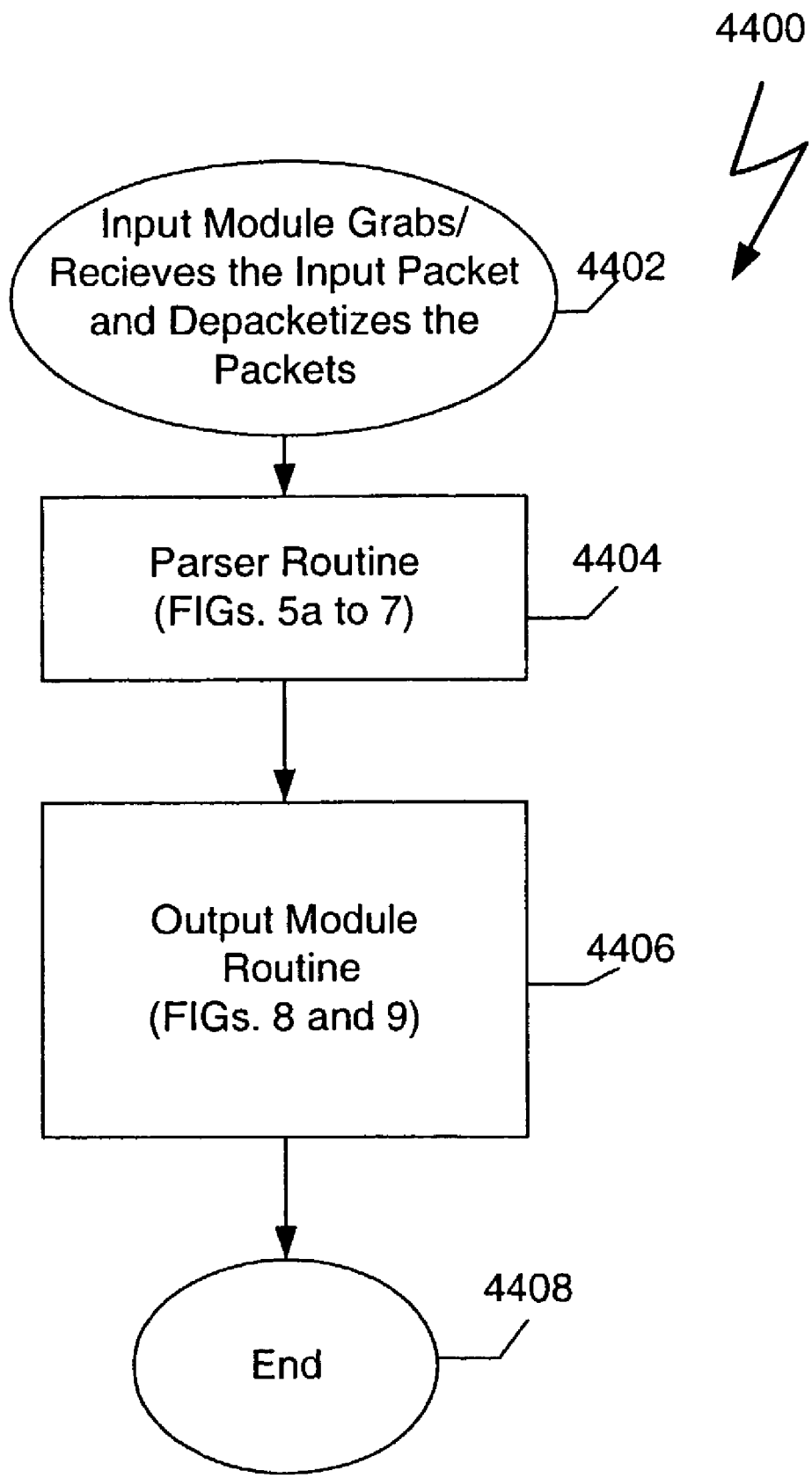
FIG. 4a is a flowchart showing the operation of the MCU of FIG. 1.

FIG. 4a is a flowchart showing the operation 4400 of MCU 100. In step 4402 the input module 140 grabs and/or receives the input video packets coming from the video source (which may be the endpoints (not shown), a recorded video source or other video source, for example) that has been assigned to the input module 140 by the conference manager 115 (FIG. 1). The input video packets are sent to the depacketizer 143, which converts the packets into a compressed video stream, according to a media transfer protocol, and then forwards the input video stream to the parser 146. In other exemplary embodiments depacketizer 143 and parser 146 may be one module.

Step 4404 represents the operation of parser 146. Parser 146 searches for GOB headers and replaces them with slice headers placing the appropriate data in the slice header, according to standard H.263 Annex K. Parser 146 also defines and/or adds recommended division points along the stream for indicating a possible location along the stream that may be used for determining where to cut the stream into a packet. A detailed description of the operation of parser 146 is disclosed below in conjunction with FIGS. 5a, 5b, 6 and 7. Parser 146 stores the modified video stream and the appropriate links (which may be pointers, for example) to the stored information in the shared memory 130. The links are stored in a certain location in the shared memory 130 that is referred as the link list. In cases where the low-resolution input compressed video is based on H.263 with annex K the received compressed video frame is already divided into slices and not GOBs. Therefore, there is no need for parser 146 to replace the GOB headers with slice headers. However, the rest of the operation of the parser is the same as the operation for video streams which are compressed according to H.263.

In step 4406, the output module 150 grabs the input buffers from the shared memory 130. The input buffers correspond to a set of input modules 140 that are assigned to output module 150 by the conference manager 115. The output module 150 reads each linked list 120 for each assigned input module 140 to obtain the locations of the input buffers in shared memory 130. The video streams associated with the input modules 140 are composed into a single output video stream. If the screen layout includes empty screen parts, information related to the empty screen parts read from the background buffer 157 is included in the composed stream. The output video stream is forwarded to or grabbed by the packetizer 155, which divides the output stream into packets based on the recommended division points, divides the information about the empty screen parts into packets, and sends the packets via the LAN 105 to their destination. FIGS. 8 and 9 discuss the operation of the packetizer 155 in more detail.

Steps 4402, 4404, and 4406 may be performed concurrently and are repeated for different video streams, the input modules 140, and the output modules 150 until the conference ends. At step 4408, the conference ends and the process 4400 stops.

Figure 4B:
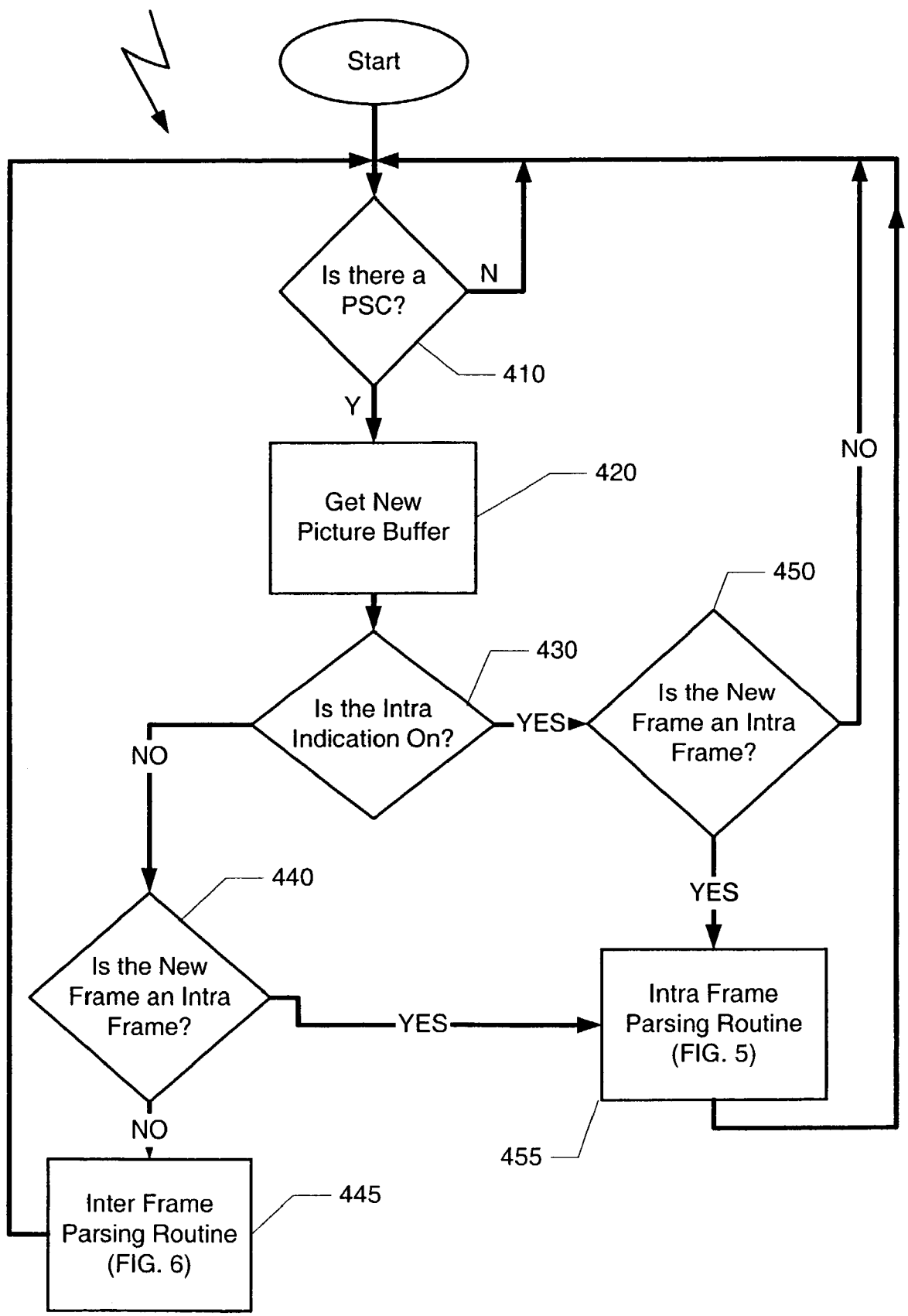
FIG. 4b is a flowchart showing an exemplary method of operations performed by parser module.

FIG. 4b is a flowchart showing an exemplary method 400 of an operation of a parser 146, which parses the compressed video stream received and/or grabbed from the depacketizer 143. The method 400 starts a loop that is entered in step 410. At a return to step 410 the loop could be ended, if the conference is over, for example. In step 410, method 400 begins by waiting to identify a Picture Start Code (PSC) along the stream, which is a code that appears at and indicates the beginning of each frame. Upon the receipt of a PSC 410 the method 400 proceeds to step 420. Next the parser 146 requests a new input buffer and a data structure for the recommended division points in the shared memory 130. Then, in step 430, a determination is made as to whether the intra indication (an indication that the system is waiting to receive an intra frame) is on, which means that the parser 146 has to wait to receive an intra frame. If the intra indication is off, then the method 400 proceeds to step 440, where it is determined if the new frame is an intra frame. If the frame is an intra frame, the parser 146 starts, in step 455, the intra frame routine, which is described below with respect to FIG. 5. If the frame is not an intra frame, then in step 445 the parser 146 starts the inter frame parsing routine, which is described below with respect to FIG. 6.

Returning to step 430, if the intra indication is on, which means that the system has to wait to receive an intra frame, then the method proceeds to step 450, where it is determined whether the new frame is in fact an intra frame (as needed). In an embodiment step 450 is performed by checking for an intra frame header. If the frame is of the intra type, parser 146 starts step 455, which runs the intra frame parsing routine. If the frame is not an intra frame, then the parser 146 releases the new picture buffer that was allocated in step 420, above, and returns to step 410 and waits for the next PSC.

In any one of the steps of method 400, if the parser 146 has lost synchronization, then it releases the current buffer, requests an intra frame from the appropriate video source, and may turn on the intra frame indication. Parser 146 may determine that the synchronization, between the transmitted information from the source and the actual received information by the MCU 100, has been lost by realizing that the GOB number is not the expected one, for example. This indicates that at least one packet was lost on the way from the source (not shown) to the MCU 100.

Upon terminating the intra frame parsing routine of step 455 or the inter frame parsing routine of step 445, the parser 146 returns to step 410 to synchronize on the next PSC.

Figure 5A:
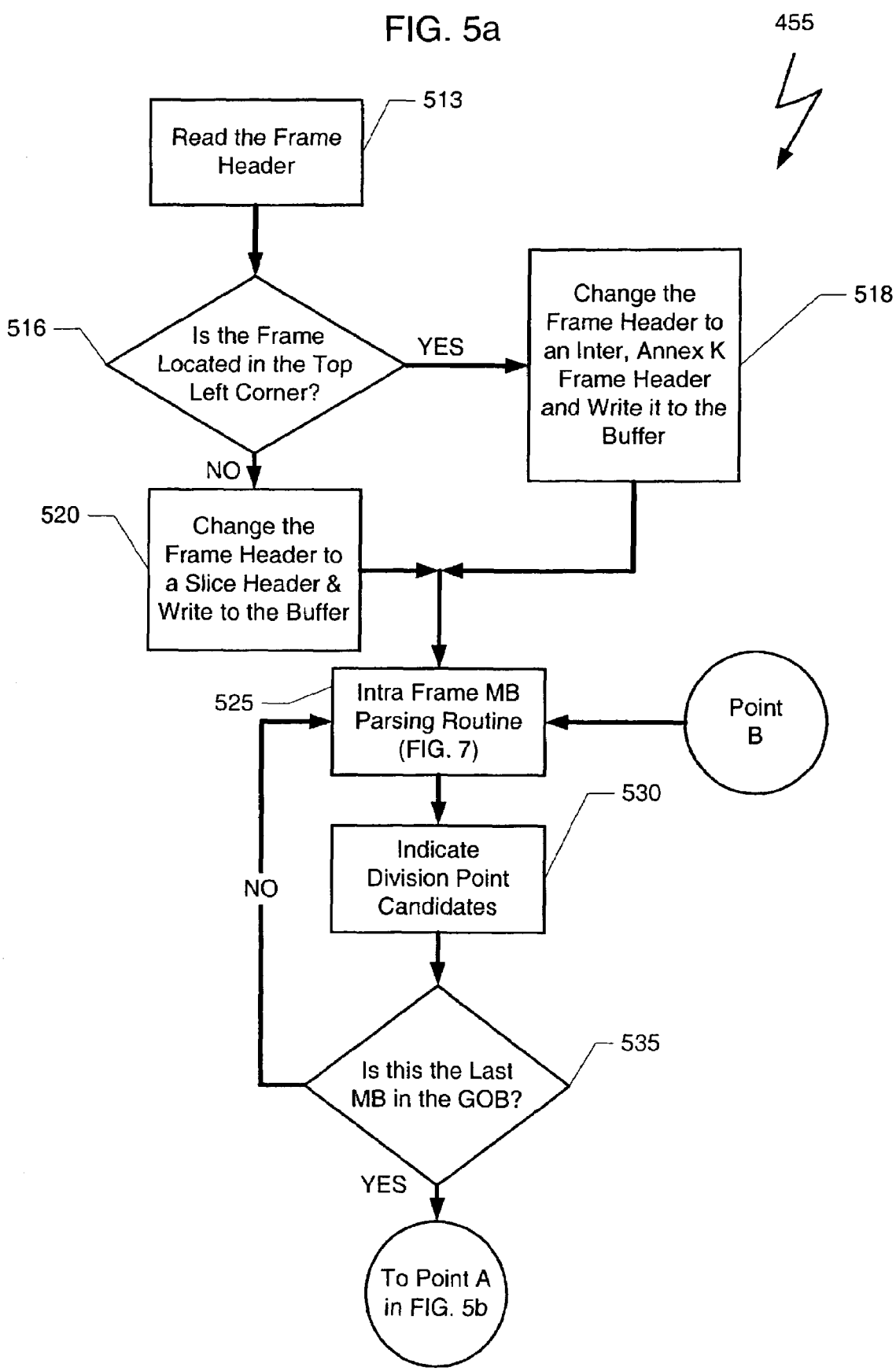
FIG. 5a and FIG. 5b are two portions of the same flowchart showing an exemplary method for parsing an intra frame.
Figure 5B:
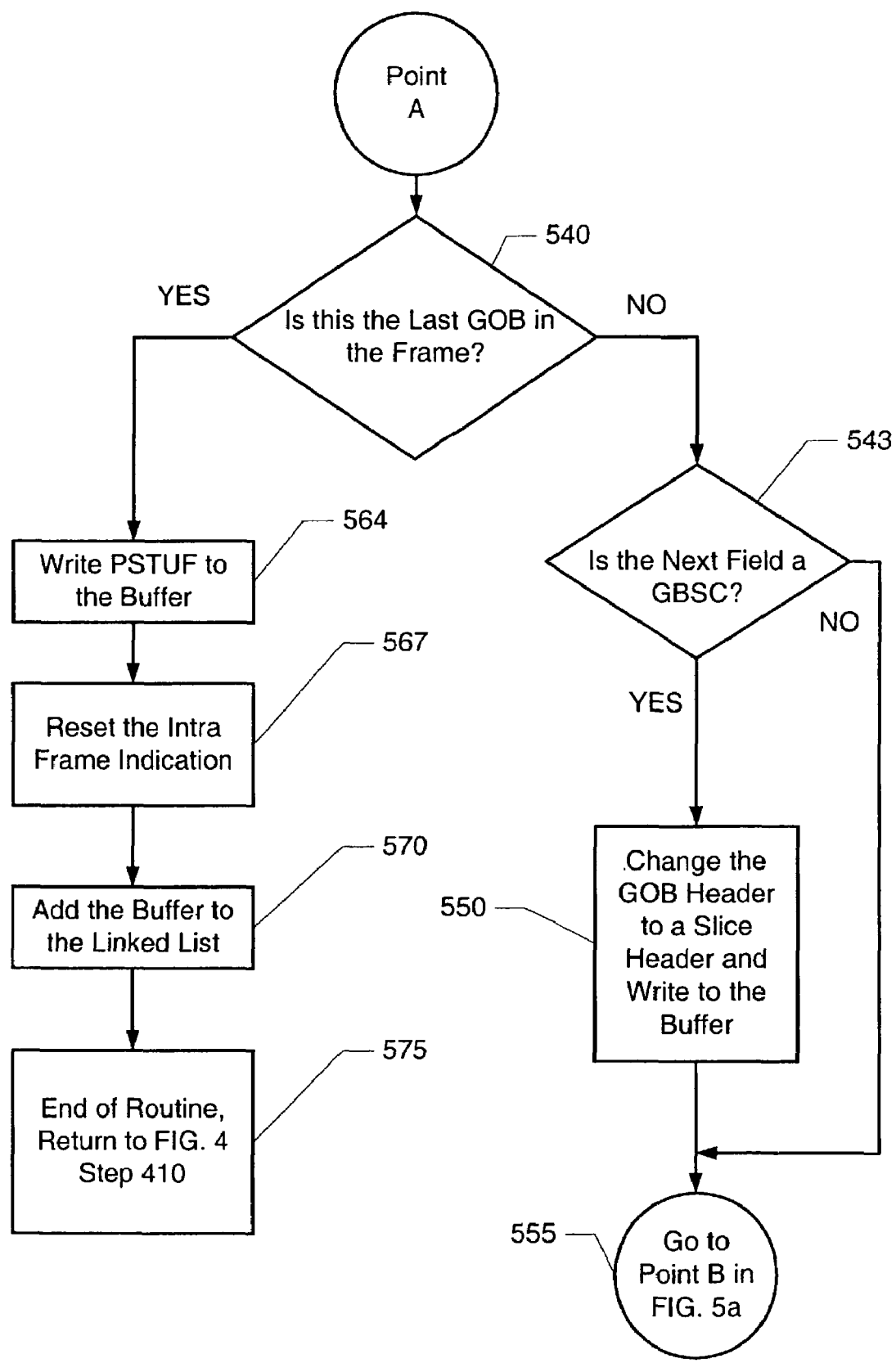

FIG. 5a and FIG. 5b are two parts of a flowchart showing an exemplary method for parsing an intra frame. The flowchart of FIGS. 5a and 5b is an elaboration of step 455 in FIG. 4.

During a video conference call over a packet network, an endpoint (not shown) may request to receive an intra frame from the MCU 100. Such a request may be initiated upon realizing that at least one packet has been lost. In response, the MCU 100 requests a low-resolution intra frame from the endpoints (not shown) that are the source of the images in the intra frame, the ones whose low-resolution frames compose the high-resolution frame of the receiver endpoint. Generally, the source endpoints may respond at different times. The time difference between the arrival of a low-resolution intra frame from the first source endpoint and the last one may be in the range of hundreds of milliseconds. In order to accelerate the response to the request from the receiver end point, MCU 100, immediately responds by sending an artificial high-resolution intra background frame. Then, upon receiving a low-resolution intra frame from one of the source endpoints, the step 455 converts the intra MBs of the low-resolution intra frame into intra MBs of an inter frame and sends them to the receiver endpoint as part of a set of consecutive high-resolution inter frames. The receiver endpoint upon receiving those intra MBs of high-resolution inter frames, installs the intra MBs instead of the appropriate MBs of the background frame. By using this method MCU 100 combines the recently received low-resolution intra frame with the rest of the image. This method eliminates the need to compose a high-resolution intra frame from, for example, 4 low-resolution intra frames. Otherwise, an MCU that does not respond with the background intra frame may need to store each one of the low-resolution intra frames and the consecutive inter frames that are coming from the different source endpoints until the last intra frame arrives. Then the other MCU has to combine the high-resolution intra frame from all the sources and continues creating the following Inter frames from the stored low-resolution inter frames. This approach creates a huge delay.

Since intra MBs are coded differently in an intra frame than intra MBs in an inter frame, the MCU 100 converts the intra frames into inter frames containing only intra MBs.

In step 513, the parser 146 reads the frame header and removes it. In step 516, based on the ID number of the first MB that has been assigned to the parser 146, the parser 146 determines whether the location of this frame is in the top left corner of the composed frame. If it is in the top left corner, the MBA (or the ID of the MB) is zero, and the parser 146 proceeds to step 518. In step 518, the parser 146 inserts a new inter frame header. The new inter frame header represents an inter CIF frame, which is compressed according to H.263 with ANNEX K, and the parser 146 writes the new frame header into the input buffer.

Then the parser 146 moves to step 525 for parsing the first intra MB in the frame.

Returning to step 516, if the location of the image is not in the top left corner of the composed screen layout, then the parser 146 proceeds to step 520, where the parser 146 converts the intra frame header to a slice header and writes the slice header in the input buffer. The process of converting the frame header to a slice header may include the steps of:

1. Installing the MB ID number, which has been assigned to the parser 146 based on its location in the screen layout, in the MBA field of the slice header.
2. Installing the PQUANT value in the SQUANT field. SQUANT is a fixed length codeword of five bits which indicates the quantizer QUANT to be used for that slice until updated by any subsequent DQUANT. The codewords are the natural binary representations of the values of QUANT which, being half the step sizes, range from 1 to 31. SQUANT is not present for the slice that follows the picture start code.
3. Writing the width of the slice in the Slice Width Indication (SWI) in the MBs field in the slice header. If a high-resolution frame is being composed from a compressed QCIF frame, the SWI will always be 11.

In step 525, the parser 146 starts a loop for parsing the intra MBs of the frame. For each MB the parser 146 jumps to the intra frame MB parsing routine of step 525. The MB parsing routine is described in conjunction with FIG. 7.

Upon terminating the intra frame MB routine of step 525 the parser proceeds to step 530 and determines whether to write a recommended division point. The decision may be based on different criteria. An exemplary criterion is the number of bytes from the last recommended division point to the end of the current MB. This indication helps the packetizer 155 during the process of dividing the composed stream into packets. An additional exemplary method may involve cooperation between depacketizer 143 and parser 148 (FIG. 1). Depacketizer 143 installs a unique pattern at the end of each received packet along the video stream, and upon identifying this pattern, the parser 146 removes it and sets an indication for recommended division points in the allocated data structure.

Then, in step 535, the parser determines whether this is the last MB in the GOB. The decision may be based on counting the MBs. If this MB is not the last, the parser 146 returns to step 525 for parsing the next MB.

If this MB is the last in the GOB, the parser 146 moves to step 540 in FIG. 5*b* and determines whether this GOB is the last GOB in the intra frame. The decision may be based on counting the GOBs.

If it is not the last GOB in the input frame, the parser 146 proceeds to step 543, where the parser 146 reads the next field and determines whether the field is a GOB SC (GBSC). If the field is not a GBSC, the parser 146 returns to step 525 in FIG. 5*a* and starts parsing the MBs.

Returning to step 543, if the field is a GBSC, the parser 146 proceeds to step 550, where the GOB header is converted into a slice header, and the slice header is written to the allocated buffer in the shared memory 130. Using this conversion eliminates the need for processing the Motion Vector Data (MVD) and the quantizers of the compressed stream, which requires real time processing and generates a delay. The delays caused by processing MVDs and quantizers can be overcome by converting the GOBs into slices.

The step 550 process of converting a GOB header into a slice header may include the steps of:

1. Writing SSTUF bits to the input buffers according to the H.263 standard.
2. Calculating the MBA field of the slice header by adding to the ID number that has been assigned to the first MB of the QCIF frame (based on its location in the screen layout), the ID number of the first MB in the current GOB.
3. Installing the GQUANT value in SQUANT field. GQUANT is a fixed length codeword of 5 bits which indicates the quantizer QUANT to be used for the remaining part of the picture until updated by any subsequent GQUANT or DQUANT. The codewords are the natural binary representations of the values of QUANT which, being half the step sizes, range from 1 to 31. SQUANT is not present for the slice that follows the picture start code.
4. Writing the width of the slice in SWI field.

After step 550, the parser 146 returns to step 525 in FIG. 5*a* and starts parsing the MBs of the new slice.

Returning to step 540, if the GOB is the last one in the low-resolution frame the parser 146 terminates the processing of the intra frame. The parser 146 proceeds to step 564, and writes the PSTUF, according to the H.263 standard, to the input buffer. In step 567, the parser 146 resets the intra frame indication, indicating that the request for an intra frame has been fulfilled. PSTUF is a codeword of variable length consisting of less than 8 zero-bits. Encoders may insert this codeword for byte alignment of the next PSC. The last bit of PSTUF may be the last (or the least significant) bit of a byte, so that the video bitstream including PSTUF is a multiple of 8 bits from the first bit in the H.263 bitstream. Decoders may be designed to discard PSTUF. In an embodiment, if for some reason the encoder stops encoding pictures for a certain time-period and resumes encoding later, PSTUF may be transmitted before the encoder stops, to prevent up to the last 7 bits of the previous picture from being sent. In an embodiment, the last bits may not be sent until the coder resumes coding.

Then, in step 570, the parser 146 adds the pointer of the allocated input buffer to the tail of the linked list 120, thereby recording the location in linked list 120 of the low-resolution frame in the shared memory 130. In step 575 the parser 146 returns to its main routine 400, step 410 in FIG. 4, waiting to the next PSC.

Figure 6A:
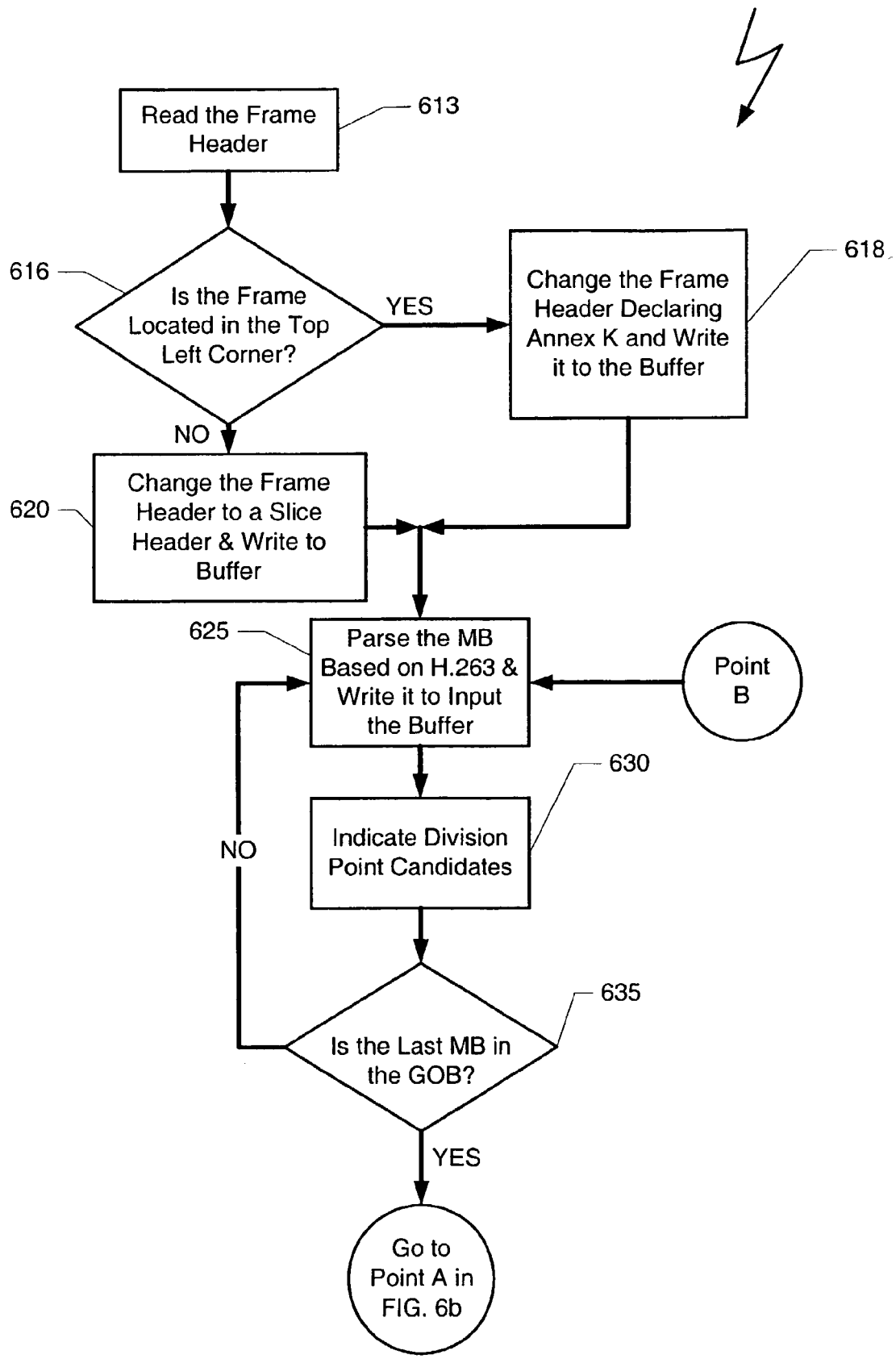
FIG. 6a and FIG. 6b are two parts of the same flowchart showing an exemplary method for parsing an inter frame.
Figure 6B:
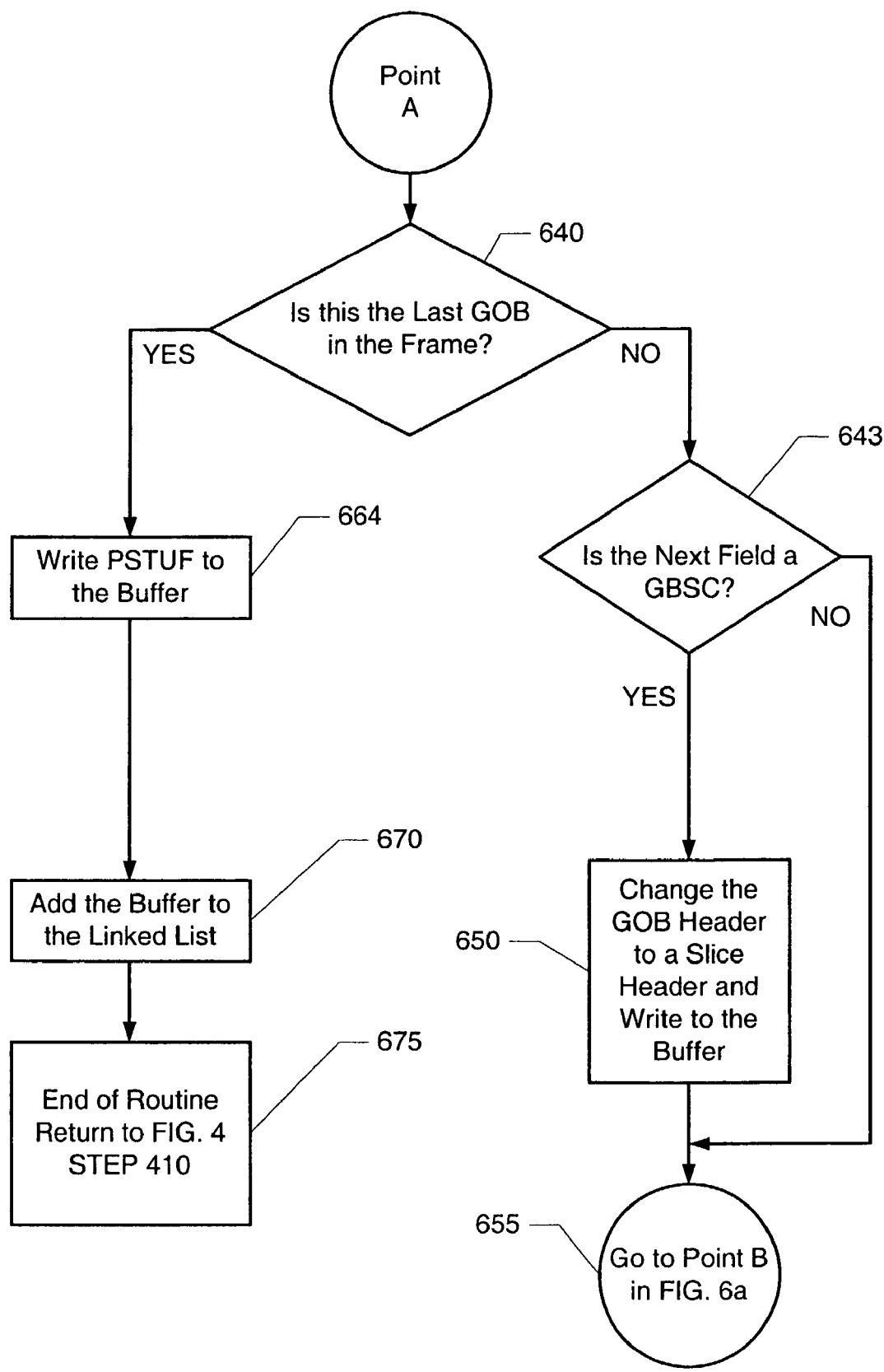

FIG. 6a and FIG. 6b are two parts of a flowchart showing the steps of an exemplary method for parsing an inter frame. Both FIGS. 6a and 6b are an elaboration of step 445 in FIG. 4b. In step 613, the parser 146 removes the frame header. In step 616, based on the ID number of the first MB that has been assigned to the parser 146, a determination is made as to whether the location of this frame is in the top left corner of the composed frame. If the frame is in the top left corner, the first MB ID number is zero. Accordingly, the parser 146 proceeds to step 618, where a new inter frame header is installed. The new inter frame header represents an inter frame of higher resolution, which is compressed according to H.263 with ANNEX K, and writes the new frame header into the allocated input buffer. Then the parser 146 moves to step 625 for parsing the first inter MB in the frame.

Returning to step 616, if the location of the image is not in the top left corner of the composed screen layout, the parser 146 proceeds to step 620, where the inter frame header is converted to a slice header, and writes the slice header in the input buffer. The conversion of the inter frame header to the slice header may include the steps of:

1. Installing the MB ID number, which has been assigned to the parser 146 based on its location in the layout and in the MBA field of the slice header.
2. Installing the PQAUNT value in the SQUANT field.
3. Writing the width of the slice in SWI field in the slice header. If the high-resolution frame is being composed from compressed QCIF frames the SWI will be always 11.

After step 620, the parser 146 proceeds to step 625, which starts a loop of parsing the MBs and writing the data in the input buffers of the frame. This parsing is common and based on the H.263 standard.

Upon terminating the parsing of the MBs in step 635, the parser 146 moves to step 630 and determines whether to write a recommended division point. The decision may be based on different criteria. An exemplary criterion is the number of bytes from the last recommended division point to the end of the current MB. This recommended division point helps the packetizer 155 during the process of dividing the composed stream, from different sources, into packets.

Then, in step 635, the parser 146 determines whether this MB is the last MB in the GOB. The decision may be based on counting the MBs. If this is not the last MB, the parser 146 returns to step 625 for parsing the next MB.

If this MB is the last in the GOB, the parser 146 moves to step 640 in FIG. 6b and determines whether this GOB is the last GOB in the inter frame. The decision may be based on counting the GOBs.

If in step 640 it is determined that this is not the last GOB in the input frame, then the parser 146 proceeds to step 643, where the parser 643 reads the next field and determines whether the field is a GBSC. If the next field is not a GBSC, then the parser 146 returns to step 625 in FIG. 6a and starts parsing the MBs.

If in step 643 it is determined that the field is a GBSC, the process proceeds to step 650, where the GOB header is converted into a slice header and the slice header is written in the allocated input buffer. Using this conversion eliminates the need for processing the MVD and the quantizers of the compressed stream, which requires real time processing and generates delay. The delay can be avoided by converting the GOBs into slices.

In step 650, converting the GOB header into a slice header may include the steps of:

1. Writing SSTUF bits to the input buffers according to the H.263 standard.
2. Calculating the MBA field of the slice header by adding the ID (MBA) number of the first MB in the current GOB, to the ID number that has been assigned to the first MB of the frame (based on its location in the screen layout).
3. Installing the GQUANT value in SQUANT field.
4. Writing the width of the slice in SWI field.

After step 650, the parser 146 returns to step 625 in FIG. 6a and starts parsing the MBs of the new slice.

Returning to step 640, if the GOB is the last one in the low-resolution frame, the parser 146 proceeds to step 664 to start terminating the processing of the inter frame. In step 664, the parser 146 writes the PSTUF, according to the H.263 standard, to the input buffer.

Then, in step 670, the parser 146 adds the pointer of the allocated input buffer to the tail of the linked list 120 and, in step 675, returns to the parser 146's main routine 400, step 410 in FIG. 4.

Figure 7:
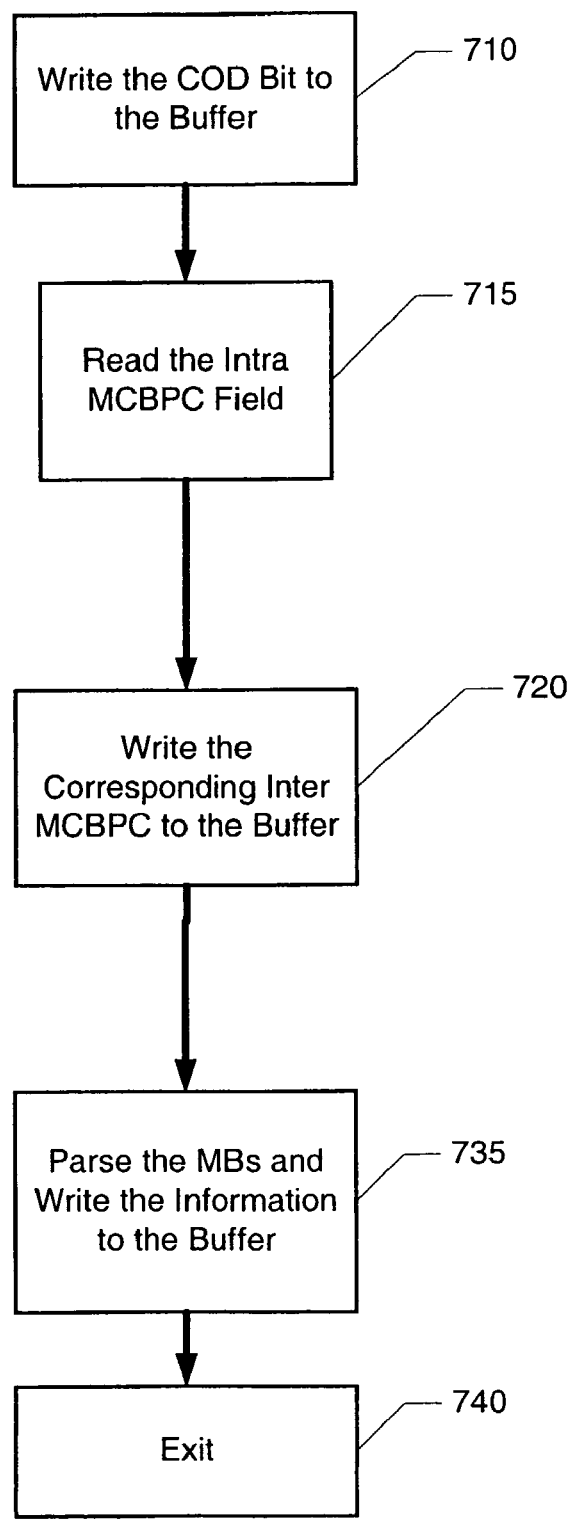
FIG. 7 is a flowchart showing an exemplary method for parsing a MB in an intra frame.

FIG. 7 is a flow diagram illustrating the steps of an exemplary method for parsing an intra MB in an intra frame and converting it into an intra MB in an inter frame. FIG. 7 is an elaboration of step 525 in FIG. 5a, which illustrates an intra frame parsing routine. In step 710, before the parser 146 (FIG. 1) starts parsing the intra MB, the parser 146 writes the Coded macroblock indication (COD) field ('0') into the buffer. The COD field indicates whether the MB is coded or not, where a value of zero means that the MB is coded. This field is not in use in an intra frame since all the MBs are coded. In an inter frame, part of the MBs may not be coded, and therefore there is a need for this field. COD is a bit which when set to "0" signals that the MB is coded. If set to "1," no further information is transmitted for this MB; in that case the decoder shall treat the MB as an inter MB with one motion vector for the whole block equal to zero and with no coefficient data. In an embodiment, the COD is only present in pictures that are not of intra type, but is present for each MB in these pictures. In the advanced prediction mode (see Annex F), overlapped block motion compensation is also performed if COD is set to "1"; and in the deblocking filter mode (see Annex J), the deblocking filter can also affect the values of some pixels of MBs having COD is set to "1."

Then, in step 715, the parser 146 reads the Macroblock type and Coded Block Pattern Chrominance (MCBPC) field of an intra frame, and in step 720 writes the corresponding Variable Length Code (VLC) to the MCBPC field of the inter frame. An exemplary conversion method may use the following look-up table, for converting the VLC for MCBPC:

TABLE 1

| MB type | CBPC 5, 6 | VLC for INTRA frame | NEW VLC for INTER frame |
|---------|-----------|---------------------|--------------------------|
| 3 | 00 | 1 | 00011 |
| 3 | 01 | 001 | 00000100 |
| 3 | 10 | 010 | 00000011 |
| 3 | 11 | 011 | 0000011 |
| 4 | 00 | 0001 | 000100 |
| 4 | 01 | 000001 | 000000100 |
| 4 | 10 | 000010 | 000000011 |
| 4 | 11 | 000011 | 000000010 |

After replacing the intra MCBPC field, in step 735, the parser 146 continues parsing the rest of the MB according to the H.263 standard and writes the information to the input buffers. At the end of the parsing the intra MB, in step 740, the parser 146 returns to the intra frame routine and proceeds to step 530 in FIG. 5a.

Figure 8A:
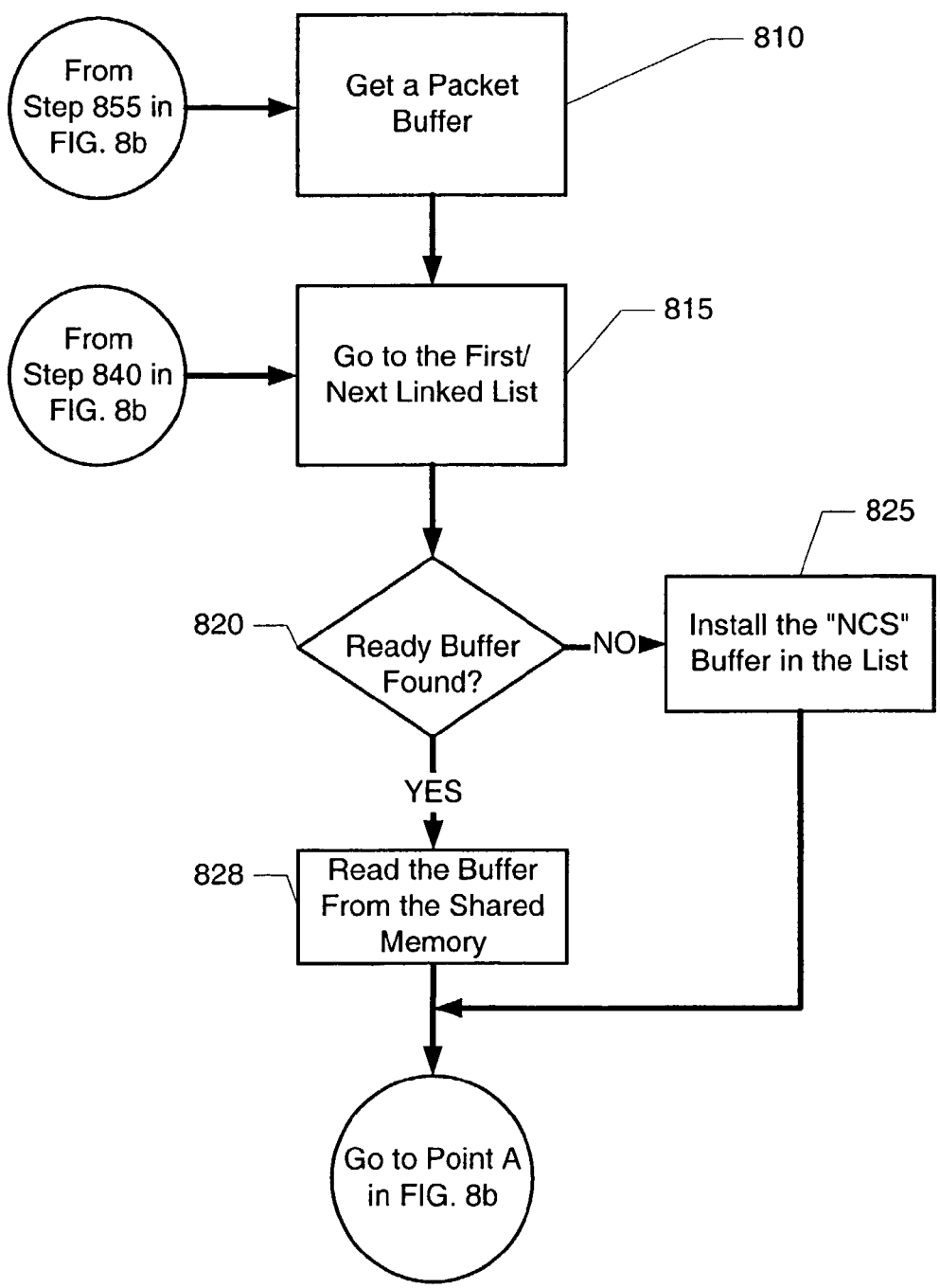
FIG. 8a and FIG. 8b are two parts of a flowchart showing an exemplary method for transmitting an inter frame.
Figure 8B:
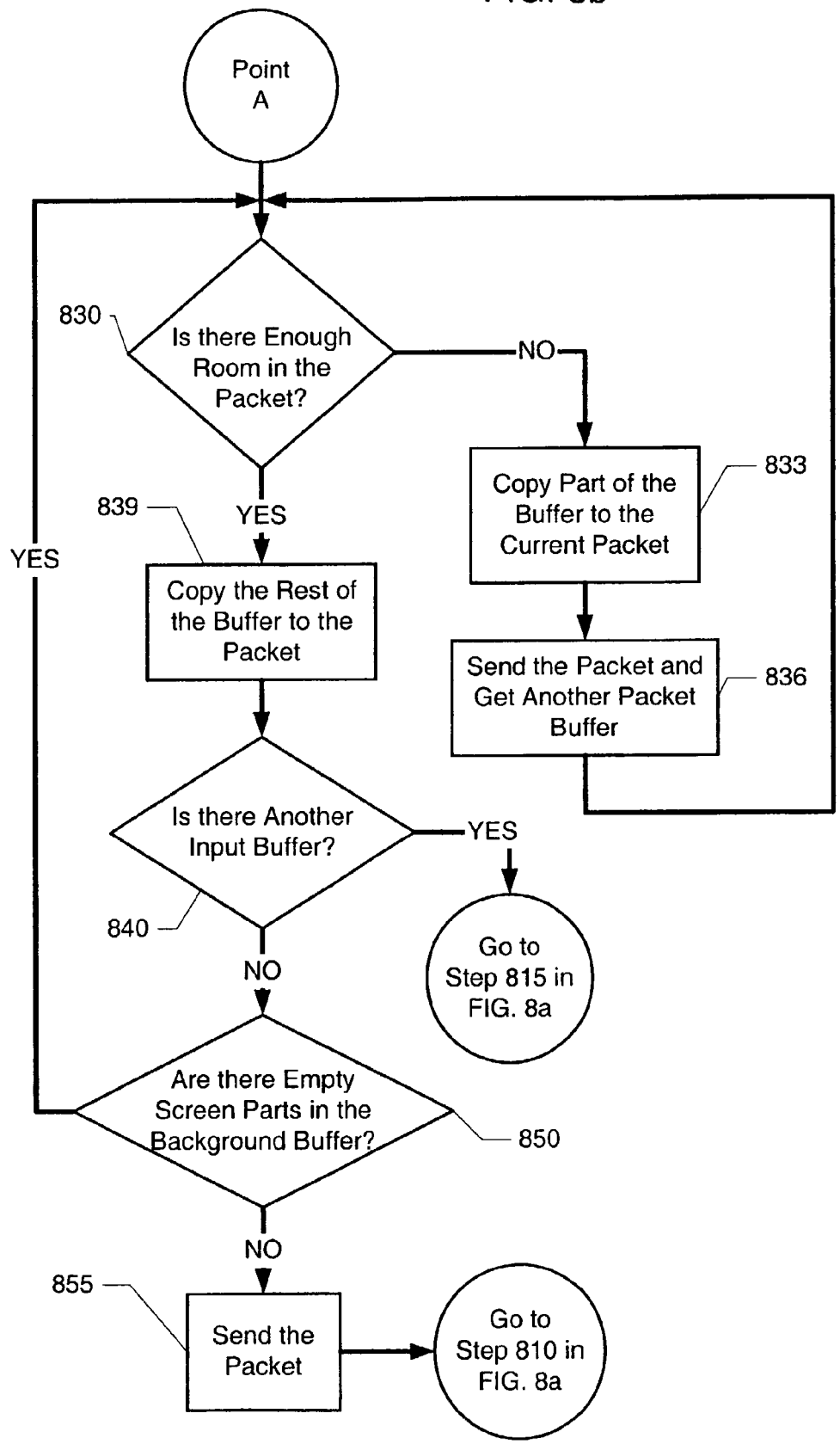

FIGS. 8a and 8b are two parts of a flowchart showing an exemplary method 800 that an output module 150 uses for transmitting an inter frame. In step 810, upon receiving a command from the conference manager 115 to send a new composed high-resolution inter frame, the packetizer 155 gets a packet payload buffer and starts a loop over all the input modules 140 that have been assigned to the packetizer 155.

In step 815, the packetizer 155 reads the linked list 120 of the first input module 140, and in step 820, determines whether there is a pointer to a ready frame buffer in the shared memory 130. If there is no such pointer, the method 800 proceeds to step 825, where the packetizer 155 installs the appropriate NCS data from the background buffer 157. Then the method 800 proceeds to step 830 (FIG. 8b). Similarly, if in step 820, there is a frame buffer ready in the linked list 120, the method 800 proceeds to step 828 (FIG. 8b). In step 828, the packetizer 155 reads the appropriate frame buffer from the shared memory 130.

In step 830, the packetizer 155 starts a loop (FIG. 8b) involving dividing the frame buffer or the NCS buffer into packets. The packetizer 155 (FIG. 1) determines whether there is enough room in the current packet for the rest of the data that is in the buffer. If there is not enough room, the method 800 proceeds to step 833, where the packetizer 155 copies part of the buffer to the current packet buffer (a buffer dedicated to the current packet). The current packet buffer may also be referred to as the packet payload buffer. The packetizer module 155 may use the recommended division point that has been prepared by the parser 146 (FIG. 1) to determine how much of the buffer is moved to the current packet buffer.

The use of recommended division points eliminates the complexity of having a parser in the output module 150 determine how much of the input buffer is copied into the current packet buffer.

Then, in step 836, the output module 150 sends the packet in the current packet buffer over the LAN 105, gets a new packet payload buffer and returns to step 830 to continue the loop of dividing the input buffer into packets.

Returning to step 830, if there is enough room in the packet for the rest of the input buffer, the method proceeds to step 839, where the packetizer 155 copies the rest of the buffer into the current packet buffer and releases the input buffers from the linked list 120. In step 840, the output module 150 determines whether there is another input module 140 that is assigned to it. If there is, the method proceeds to step 815 and reads the linked list 120 of the next input module 140.

If there is no other input module 140 assigned to output module 150, the method proceeds to step 850, where the packetizer 155 checks if there are empty screen parts in the background buffer 157. If there are empty screen parts, the packetizer 155 returns to step 830 and starts a loop of dividing the empty screen part buffers into packets. If, in step 850, it is determined that there are no additional empty screen parts or that the packetizer 155 has divided all of the content of the input buffer into packets, the method proceeds to step 855, where the packetizer 155 sends the last packet of the current high-resolution composed inter frame to the LAN 105. Then the packetizer 155 waits to receive a command from the conference manager 115 to send a new high-resolution composed frame.

FIG. 9 is a flowchart showing an exemplary method 900 for transmitting an intra frame. Method 900 starts with step 910, where upon receiving the command to transmit an intra frame, the packetizer 155 cleans the linked list 120 and gets a new current packet buffer. Then the packetizer 155 reads the intra background frame from the background buffer 157 and starts the loop of dividing the background frame buffer into packets.

In step 920 the packetizer 155 determines whether there is enough room in the current packet for the rest of the data that is in the input buffer. If there is not enough room, the method proceeds to step 923, where the packetizer copies part of the buffer to the current packet buffer. The packetizer 155 may use the recommended division point that has been previously prepared for determining how the input buffer is copied to the current packet buffer.

Then, in step 926, the output module 150 sends the packet over LAN 105, gets a new packet payload, places the new packet payload in the input buffer, and returns to step 920 to continue the loop of dividing the Intra background frame into packets.

If, in step 920, it is determined that there is enough room in the packet for the rest of the Intra background frame, the method proceeds to step 930, where the packetizer 155 copies the rest of the buffer 930 into the current packet buffer and, in step 935, sends the packet from the current packet buffer over LAN 105.

Then, in step 940, since the request for an intra frame has been fulfilled, the packetizer 155 resets the intra frame indication and waits for the next command to send an intra or an inter frame.

FIG. 10 is a flow diagram illustrating the steps of an exemplary method 1000 for handling a fast update request (a request for an intra frame) from at least one of the endpoints that receives the output of the packetizer 155.

In step 1020, upon receiving the fast update request, the conference manager 115 turns on the intra frame request indication. After step 1020, method 1000 divides into two parallel branches. The first branch, the parser branch 1040, proceeds to step 1042, where in response to the intra frame request being turned on, each parser 146 releases its current input buffers and then in step 1044 returns to its main routine 400 to step 410 in FIG. 4.

In parallel, on the second branch, the packetizer branch 1030, the method proceeds to step 1033, where the packetizer 155 releases the linked list 120 in all the input modules 140 that are assigned to the packetizer 155 and then in step 1036 jumps to intra frame transmission routine 900 to step 910 in FIG. 9.

Those skilled in the art will appreciate that the present invention is not limited to composing one or more QCIF input frames to a CIF output frame. The present invention may be used in composing compressed video data, which is received from low-resolution video sources of types other than QCIF into a higher resolution video frame having a type other than CIF. For example, the present invention may be used in composing up to 16 sources of QCIF frames of compressed video data into a single high-resolution 4CIF frame, or composing up to four sources of CIF frames of compressed video data into a single high-resolution 4CIF frame. The present invention also supports composing different resolutions, such as composing three CIF frames and four QCIF frames into a single 4CIF output frame, for example.

Those skilled in the art will appreciate that the present invention can be either in the form of additional software residing in the MCU that performs the methods that have been disclosed in the present application, or in the form of additional hardware, which has been added to the MCU.

Furthermore, those skilled in the art will appreciate that the present invention can be used in other compression standards such as, but not limited to, MPEG 4.

In the description and claims of the present application, each of the verbs, "comprise," "include," and "have," and conjugates thereof, are used to indicate that the object or objects of the verb are not necessarily a complete listing of members, components, elements, or parts of their respective subjects or verb.

The present invention has been described using detailed descriptions of embodiments thereof that are provided by way of example and are not intended to limit the scope of the invention.

The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art. The scope of the invention is limited only by the following claims.

What is claimed is:

1. A method for use in composing a plurality of compressed video input streams, at least one input stream having a first resolution, into a single output stream in another resolution that is higher than the first resolution, the method comprising:
   receiving a request to transmit a high resolution intra frame to a requesting endpoint;
   in response, requesting a low resolution intra frame from a transmitting endpoint;
   converting the low resolution intra frame into intra macro blocks of an inter frame;
   transmitting a high resolution intra background frame to the requesting endpoint; and
   transmitting the macro blocks to the requesting endpoint as a set of consecutive high resolution inter frames.

2. The method of claim 1, wherein at least one of the plurality of compressed video input streams has been compressed according to a compression standard selected from a group consisting of H.263 and MPEG 4.

3. The method of claim 1, wherein the first resolution includes at least one type of resolution selected from a group consisting of QCIF, CIF and 4CIF.

4. The method of claim 1, wherein the other resolution includes at least one type of resolution selected from a group consisting of CIF, 4CIF and 16CIF.

5. The method of claim 1 further comprising: converting at least one of the plurality of compressed video input streams into H.263 Annex K compression standard.

6. The method of claim 1 wherein the composing further comprises converting Groups Of Block (GOB) headers in the compressed video input streams into slice headers in the single output stream.

7. A method comprising: composing a plurality of compressed video input streams, each stream having an input resolution, into a single output stream of an output resolution that is higher than the input resolution of the compressed video input streams, by at least
   converting the plurality of compressed video input streams into high-resolution H.263 with Annex K compression standard, if the compressed video input stream is not already in a format based on the H.263 with Annex K standard;
   converting Groups Of Blocks (GOBs) headers in the compressed video input streams into slice headers, if the compressed video input stream is not already in a format based on the H.263 with Annex K standard; and
   responding to a video update request from a receiver by transmitting an intra background frame; requesting a low resolution intra frame from a transmitting endpoint; sending a high resolution intra background frame to the receiver; converting the low resolution intra frame into intra macro blocks of an inter frame; and transmitting the macro blocks to the requesting endpoint as a set of consecutive high-resolution inter frames.

8. A system comprising:
a plurality of conference modules, each conference module including
   (I) a shared memory having buffers;
   (II) a plurality of input modules associated with a plurality of input streams, a plurality of parsers, a plurality of depacketizers, and a plurality of linked lists, each of the input modules having at least
      (A) one of the plurality of depacketizers that depacketizes one of the plurality of input streams of a first resolution, which is divided into Groups Of Blocks (GOBs) or slices from a network,
      (B) one of the plurality of parser that
         (1) converts the GOBs' headers into slice headers,
         (2) converts intra frames of the first resolution into inter frames of a second resolution that is higher than the first resolution,
         (3) generates recommended division points,
         (4) delivers a converted stream in portions to the buffers, where the converted stream is a compressed video stream of the second resolution having the inter frames of the second resolution and the slice headers, and
         (5) generates at least one of the plurality of linked lists, each linked list being a list of pointers pointing to where corresponding ones of the portions are stored in the buffers;
   (III) a plurality of output modules for processing the buffers designated in the plurality of linked lists, the plurality of input streams being associated with the buffers and each of a group of the plurality of output modules composing at least part of the plurality of input streams into one output stream of the second resolution, each output module having at least
      (A) a background buffer for storing information associated with empty screen parts of the output stream, and
      (B) a packetizer for dividing the output stream into packets and sending the packets via the network to endpoints; and
   (IV) a conference manager that
      (A) communicates with a host regarding how to layout a conference, and
      (B) assigns the group of input modules to the output module.

* * * * *